Patented Feb. 7, 1950

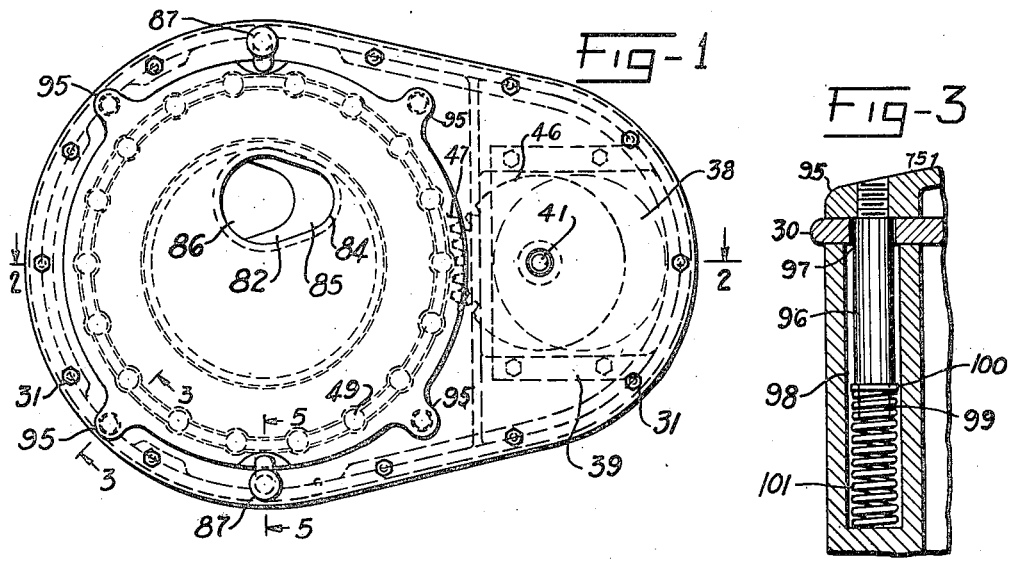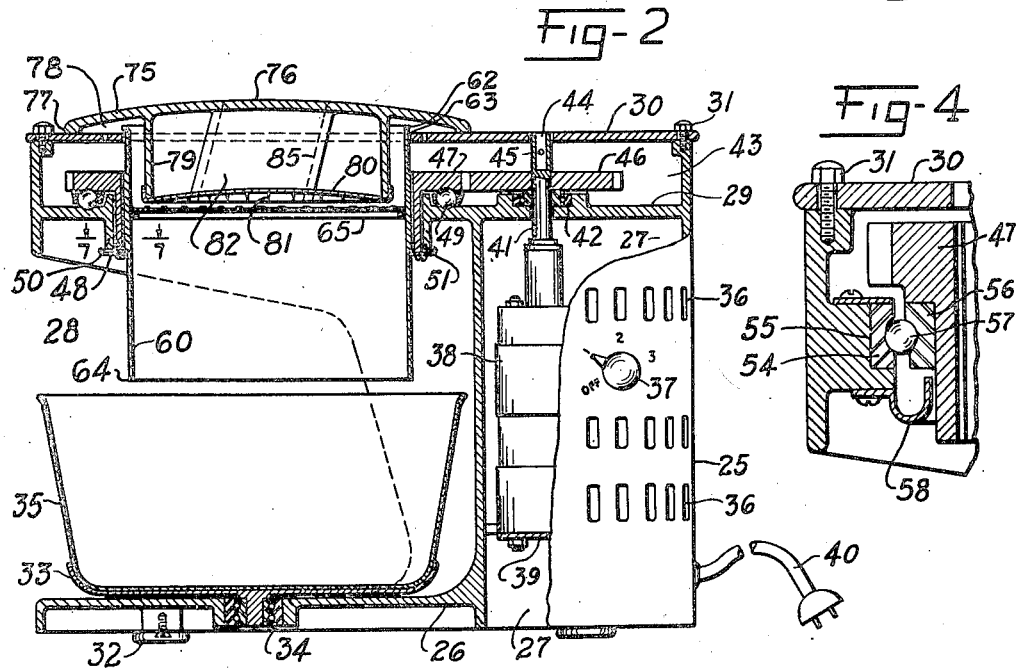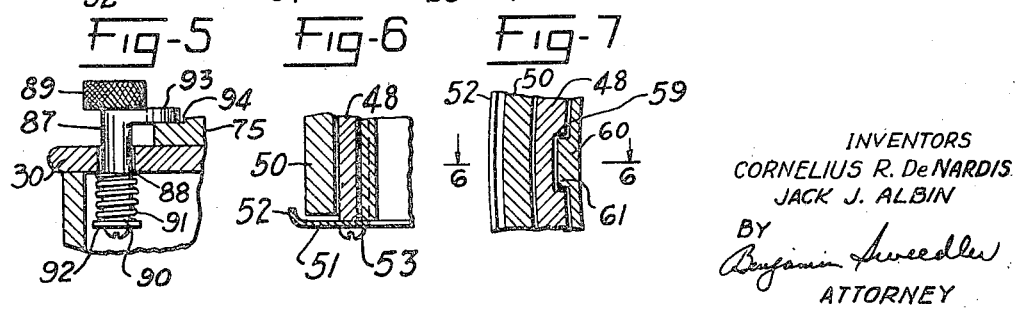

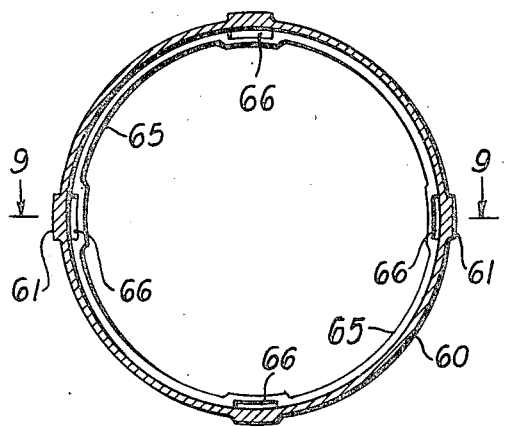
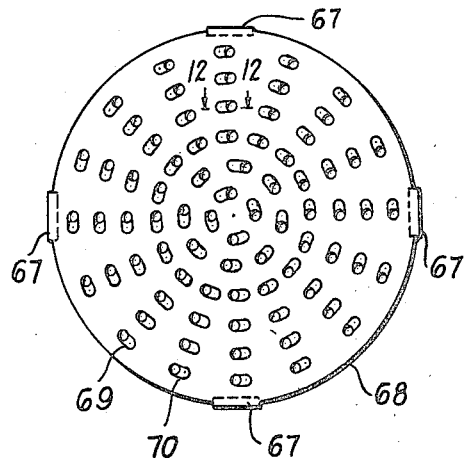
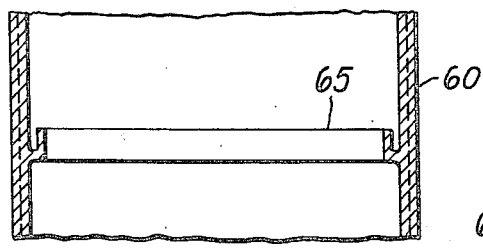
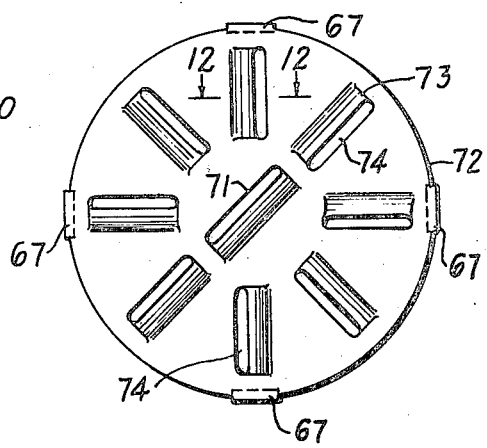
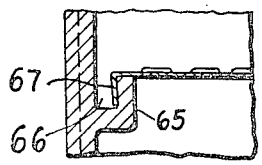
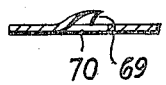

2,496,780

UNITED STATES PATENT OFFICE 2,496,780

KITCHEN SHREDDER FOR BOTH LEAFY AND STALKY VEGETABLES

Cornelius R. de Nardis, Elmhurst, and
Jack J. Albin, Far Rockaway, N. Y.

Application January 14, 1947, Serial No. 721,934

1 Claim. (Cl. 146—177)

This invention relates to kitchen utility devices of the type adapted to shred or grate vegetables, including leafy vegetables such as cabbage and lettuce and stalk-type vegetables such as celery and carrots. In the specification and claims the term "grater" is used in a broad sense to include shredders; likewise the verb "grate" is used in a broad sense to include shredding operations.

One object of this invention is to provide such kitchen utility device which may be used to grate vegetables of all kinds, including bulky leafy vegetables, as well as stalk-type vegetables.

Another object of this invention is to provide such device which while simple in construction, particularly in that it involves relatively few parts and is therefore relatively inexpensive to produce, is sturdy and rugged and has a wide range of use.

Other objects and advantages of this invention will be apparent from the following detailed description thereof.

In the preferred embodiment illustrated on the drawings, the invention is shown incorporated in a grater driven by an electric motor and the present description will be confined to the present illustrated embodiment of the invention. It will be understood, however, that the novel features and improvements are susceptible to other applications, such for example as a grater or shredder which is driven by other power means or is suitably hand-driven. Hence, the scope of this invention is not confined to the embodiment herein described.

In the accompanying drawings forming a part of this specification and showing, for purposes of exemplification a preferred embodiment of this invention without limiting the claimed invention to such illustrative instances Figure 1 is a plan view of a kitchen utility device embodying this invention and showing the grater unit in operative position;

Figure 2 is a vertical section taken in a plane passing through line 2—2 of Figure 1, the motor and a broken away portion of the motor casing are shown in elevation;

Figure 3 is a fragmentary vertical sectional detail taken in a plane passing through line 3—3 of Figure 1, on a greatly enlarged scale as compared with the scale of Figures 1 and 2 and showing one form of flexible mounting for the grater cover;

Figure 4 is a fragmentary vertical section also on a greatly enlarged scale showing an alternative form of ball bearing mounting for the hollow gear as compared with the showing of Figure 2;

Figure 5 is a fragmentary sectional detail partly in elevation taken in a plane passing through line 5—5 of Figure 1 and showing a clamp for holding the grater cover in clamped position when the device is used for grating stalky vegetables;

Figure 6 is a fragmentary vertical section taken in a plane passing through line 6—6 of Figure 7 showing one form of lubricant retainer for the base portion of the hollow gear;

Figure 7 is a fragmentary horizontal section taken in a plane passing through line 7—7 of Figure 2;

Figure 8 is a horizontal section through the removable chute shown in Figure 2 providing a support for the grater;

Figure 9 is a fragmentary vertical section through the chute of Figure 8 taken in a plane passing through line 9—9 of Figure 8;

Figure 10 is a fragmentary vertical section corresponding to the section of Figure 9 but showing the grater in position;

Figure 11 is a plan view of one form of grater;

Figure 12 is a fragmentary vertical section taken in a plane passing through line 12—12 of Figure 11 and line 12—12 of Figure 13; and Figure 13 is a plan view of a modified form of grater.

Referring to the drawings in which like parts are indicated by like reference characters, 25 is a casing of cylindrical or other desired shape provided with a base 26, a motor housing 27, a cutaway portion 28 in the front wall thereof, a bearing plate 29 disposed near the top of the casing and a removable top or cover plate 30. The latter plate 30 may be removably secured by bolts 31 threadably engaging threaded openings in the flanges disposed at the top edge of the side walls of casing 25. Leg or other suitable members 32 are secured to the base to provide a support for the device. The base of these legs may have bonded thereto felt or other analogous material to avoid scratching or marring a polished surface on which the device may be placed.

Base plate 26 is provided with a bowl supporting plate 33 which is mounted for rotation in the base plate by ball bearing mounting 34. A bowl 35 is shown disposed on the plate 33 for rotation therewith.

Motor housing 27 has the casing wall defining this housing provided with ventilation openings 36. Disposed on this casing wall is a power switch 37 of any well known type which controls the energization of motor 38 suitably mounted on a supporting plate 39 extending across the motor housing and welded or otherwise suitably secured to the walls of housing 27. The switch shown is provided with four control points, namely off and three speeds, low, medium and high indicated by the numbers 1, 2 and 3. Other types of switches may of course be used. Electric current is supplied to motor 38 through a power line cord 40 which may be plugged into any convenient current source.

The armature shaft 41 of the motor extends through a ball bearing 42 disposed on the bearing plate 29. This shaft extends the full depth of the gear housing 43 into an opening in the removable top plate 30 and terminates flush with this top plate The top of this shaft is provided with a cylindrical opening 44 across which extends a cross pin 45, the function of which will be hereinafter described.

Keyed to armature shaft 41 is a gear 46 with which meshes a gear 47. Both of these gears, it will be noted from Figure 2, for example, lie in a horizontal plane. Gear 47 consists of a horizontal plane. Gear 47 consists of a horizontally extending toothed portion arranged to mesh with the teeth on gear 46 and be driven thereby and a vertically extending skirt 48 defining the central hollow or open portion of this gear. A ball bearing 49 is disposed on the bearing plate 29 supporting the gear 47 for free rotary movement. This ball bearing 49 is positioned adjacent to a guide flange 50 formed on the bearing plate 29 to provide a bearing surface for skirt 48 of gear 47. A small clearance is provided between guide flange 50 and the skirt 48 for free movement of skirt 48 relative to flange 50. To prevent leakage of the lubricant lubricating the ball bearing 49 as well as the bearing between flange 50 and the skirt 48 an annular pan 51 having an upstanding lip 52 is detachably secured, as by screws 53, to the end of skirt 48 as clearly shown in Figure 6.

Instead of having a horizontally disposed ball bearing mounting for the gear 47, as shown in Figure 2, a vertically disposed ball bearing mounting as shown in Figure 4 may be used. In Figure 4 one-half of a ball bearing race 54 is suitably mounted on a flange 55 integral with the side wall of the casing 25 and the other half 56 of the ball bearing race is mounted on a side wall of gear 47. Thus the gear 47 is supported for rotary movement by the ball bearings 57 in the race 54, 56. Retainer pan 58 is detachably secured to flange 55 to catch any lubricant which may drop from the ball bearing; this pan 58 prevents such lubricant from leaking into the bowl 35 containing the foodstuff.

Skirt 48 of gear 47 is provided with a longitudinally extending groove 59 (Figure 7) which extends the full length of the interior wall of the gear 47, i. e., along the upper portion of the gear as well as along the contiguous skirt 48. Desirably two such grooves are formed along the interior wall of the hollow gear on diametrically opposed sides thereof. Chute 60, desirably cylindrical in shape, has projections 61, of a shape complemental to the shape of grooves 59, disposed on diametrically opposite sides of the outer wall thereof intermediate the top and bottom of the chute as shown in Figure 2. These projections are of a length equal to the length of grooves 59. When assembling the chute with the gears, the chute is moved through the central opening in gear 47 with the projections 61 fitting within the grooves 59 and is thus mounted for rotation within gear 47. The upper portion of this chute 60 is flared as at 62 so that it cannot pass through circular opening 63 in top plate 30, the axis of which opening is substantially coaxial with that of the opening in gear 47 Chute 60 is thereby maintained in desired position, a small clearance being provided between the outer wall of this chute and the walls of opening 63 to permit the free rotation of the chute when gear 47 is rotated. The lower end 64 of the chute desirably terminates just above the bowl 35.

As shown in Figures 8 and 9, the interior of chute 60 is provided with an integral flange 65 disposed on the side wall thereof approximately midway between the top and bottom of the projections 61 (see Figure 2) so that when the chute is in operative position flange 65 is disposed approximately in the same horizontal plane as the bearing plate 29. Flange 65 has rectangular openings 66 desirably positioned at diametrically opposite points as shown in Figure 8 for the reception of rectangular complementary projections 67 depending from the periphery of grater 68. Thus the grater 68 may be locked in position within the chute 60 by the projections 67 entering the openings 66; the flat peripheral edge portion of the grater or shredder resting on the top edge of the flange 65 as shown in Figure 10. With this construction the grater 68 may be readily removed for cleaning and replaced, or one type grater may readily be replaced by another type to produce flakes or gratings of any desired size or shape.

The grater 68 may be of any well known type. Figure 11 shows a grater having upstanding cutting edges 69 for engagement with the vegetables to be grated to cut or shear the vegetables into flakes or particles of other desired shape or contour and openings 70 through which the particles fall. In Figure 11 the grater is shown consisting of a disc having a multiplicity of upstanding cutting edges 69 arranged in circular formation, the circles being concentric and each cutting edge being relatively narrow. A modified form of grater is shown in Figure 13 involving a relatively wide upstanding cutting member 71 centrally disposed relative to the disc 72, having a series of relatively wide cutting members 73 disposed in a circle and having elongated slots 74 through which the grated particles pass into the chute 60 and thence to the bowl 35.

To maintain the material to be grated in contact with the grater a cover 75 for the upper portion of the chute 60 is provided. The top plate 76 of this cover is of concave shape, has a diameter substantially greater than that of the chute and has a flange 77 normally engaging the plate 30 at a point spaced from the opening 63 forming an annular clearance space 78 surrounding the top end of chute 60. The chute rotates in this space, the cover protecting the operator from accidentally engaging the rotating end of the chute. A cylindrical depending portion 79 centrally disposed with respect to the plate 76 extends downwardly therefrom. This depending portion has a diameter somewhat less than the diameter of the chute 60 so that when the cover is in position the depending portion 79 fits within the chute. Secured to the base of this depending portion is a concave plate 80 provided with teeth or prongs 81 (Figure 2) for engaging the material to be grated.

An opening 82 extends through top plate 76 of cover 75 as well as through the depending portion 79 and the concave plate 80. The axis of this opening is at an acute angle to the grating surface. It may have a substantially elliptical top opening 84 and inclined side walls 85 merging with a bottom opening 86 of smaller cross sectional area than the top opening as shown in Figures 1 and 2. Stalky vegetables, such as carrots or celery, may be fed one or more at a time through this opening, guided by the side walls thereof so that the ends are maintained in contact with the grater, the stalks being pushed through opening 82 by a handle formed to fit this opening. This handle is manipulated by the operator to maintain the ends of the stalky vegetables in contact with the grater.

To maintain the cover 75 in fixed position while the grater is used for grating stalky vegetables a clamping device such as shown in Figures 1 and 5 is employed. This clamping device consists of a pair of clamping bolts 87 disposed at diametrically opposed sides of the cover as shown in Figure 1. Each bolt passes through an opening 88 in plate 30, has knurled knob 89 for moving the clamping bolt and a depending portion 90 on which a spring 91 is mounted. This spring is fastened between a collar or washer 92 on the depending portion 90 and the underside of the top plate 30. Each clamping bolt 87 is provided with an extension 93 arranged to bear upon flat portion 94 of the cover 75. When the clamp is in the position shown in Figures 1 and 5, spring 91 exerts tension on the collar or washer 92 so that the extension 93 clamps the cover 75 to the plate 30. When it is desired to release the cover 75, the knurled knobs 89 are employed to turn bolts 87 against the action of the spring 91 so that extensions 93 no longer engage the flat surfaces 94 on cover plate 76.

When the grater is employed to grate leafy vegetables such as cabbage, lettuce, etc., cover 75 is maintained under spring tension, the action of the springs tending to move the cover away from the grating surface. The operator, by the pressure of his or her hand on the cover 75 opposing this spring action, maintains the material to be grated under the desired pressure to effect the grating. For this purpose, as shown in Figure 1, the cover plate 76 is provided with extensions 95, preferably four in number, such extensions being equi-spaced about the periphery of the plate 76 as shown in Figure 1. Since the structure of each extension and cooperating bolt and spring housing is the same only one will be described. Threaded into a threaded opening in each extension 95 is a bolt 96 which passes through an opening 97 in the top plate 30. Associated with each of the openings 97 is a spring housing 98 which desirably may be made integral with the outer wall of the casing 25. Each bolt has a reduced end 99 passing through an opening in a washer 100. Disposed between this washer and the bottom wall of the spring housing is a compression spring 101. The spring 101 and washer 100 are inserted in housing 98 before cover 30 is welded or otherwise fastened in position. The spring and washer are thus maintained within their housing so that they can not be readily removed therefrom, the diameter of opening 97 being smaller than that of washer 100. The reduced ends of bolts 96 pass through the openings in the washers 100, the springs 101 exerting pressure on the washers 101 and through the washers onto the bolts 96 and cover 75 in a direction tending to force the cover away from the grating surface. The cover and associated parts, however, are so designed that even though no pressure is applied by the operator to the top of cover 75 the cover is maintained above the top of chute 60 with the ends of the bolts disposed within spring housing 98. When pressure is applied by the operator's hand the springs 101 provide what might well be considered a spring cushioned force which opposes this pressure. Furthermore, it will be noted the mounting for the cover is such that by simply engaging the cover 75 it and the associated bolts 96 may be removed to give access to the grater 68.

In operation, when it is desired to grate leafy vegetables, such for example as cabbage, the cover 75 is removed, the cabbage placed on the grater within the chute 60 and the cover then placed over the cabbage so that the teeth 81 engage the top of the cabbage. If the size of the cabbage or other vegetable is such that it does not readily enter chute 60 it is first cut into portions such that each portion will fit within the top portion of the chute 60 without protruding therefrom. The operator applies pressure by his or her hand to the top of the cover plate to maintain the cabbage in contact with the grating surface as the grater is rotated. In the continued operation of the machine, as the cabbage is consumed the cover 75 descends, more and more of the depending portion 79 entering within the chute 60. When the cabbage has been substantially completely grated the cover will have reached the point where the flange 77 engages plate 30 as shown in Figure 2. Any residual material may be left in the grater to be grated in the continued operation on a subsequent charge of material.

When the grater is employed to grate stalky vegetables, as hereinabove described, the cover 75 is locked by means of clamps 87 and the stalky vegetable fed through the opening 82 in the cover.

It will be noted that the present invention provides a kitchen utility device which may be used to grate vegetables of all kinds, including bulky, leafy vegetables such as cabbage or lettuce as well as stalky vegetables such as carrots or celery. It will also be noted that the kitchen utility device of this invention is simple in construction, involves relatively few parts, is sturdy and rugged in design and has a wide range of uses both in household and industrial kitchens.

Since different embodiments of the invention could be made without departing from the scope of this invention, it is intended that all matter contained in the above description or shown in the accompanying drawings shall be interpreted as illustrative and not in a limiting sense.

What is claimed is:

In a kitchen utility device for shredding both leafy and stalky vegetables, a cylindrical casing having an opening in the front wall thereof and a motor housing near the back wall, a rotatable bowl supporting plate disposed near the bottom of said opening, a bowl on said plate, an electric motor in said housing, a bearing plate extending across said casing near the top thereof, said plate having a circular opening therein, a gear housing the base of which is defined by said bearing plate, a motor shaft extending through said gear housing, a gear fixed to the motor shaft, a second gear meshing with the first-mentioned gear, both of said gears lying in a substantially horizontal plane and being disposed within said gear housing, the second-mentioned gear having a circular opening the axis of which is coaxial with the axis of the gear and with that of the opening in the bearing plate, the wall of said opening in said gear being provided with slots adapted to receive complemental projections on a chute, a grater in said chute, a cover for said chute, said cover having a depending portion extending within said chute and arranged to engage leafy vegetables to maintain them in contact with said grater, a spring mounting for said cover tending to move the cover away from said grater, the operator by applying pressure to said cover, through said depending portion maintaining leafy vegetables to be grated in contact with said grater, means for clamping said cover in a fixed position, said cover having an opening passing therethrough and through said depending portion through which opening a stalky vegetable may be introduced and one end thereof brought into contact with the grater and the said end grated while the stalky vegetable is held by the operator in said opening with the said end in contact with said grater.

CORNELIUS R. DE NARDIS.
JACK J. ALBIN.

REFERENCES CITED

The following references are of record in the file of this patent:

UNITED STATES PATENTS

| Number | Name | Date |
|---|---|---|
| 625,507 | Hunt | May 23, 1899 |
| 931,295 | Hagemeyer | Aug. 17, 1909 |
| 1,251,612 | Zanvettor | Jan. 1, 1918 |
| 1,367,402 | Kulakowski | Feb. 1, 1921 |
| 1,752,160 | Erl | Mar. 25, 1930 |
| 2,011,211 | Brown | Aug. 13, 1935 |
| 2,057,564 | Edgerton | Oct. 13, 1936 |
| 2,131,290 | Kochner et al. | Sept. 27, 1938 |
| 2,131,377 | Kohl | Sept. 27, 1938 |
| 2,206,204 | Richli | July 2, 1940 |
| 2,208,335 | Kurtz | July 16, 1940 |
| 2,289,958 | Grau | July 14, 1942 |
| 2,368,897 | Strauss | Feb. 6, 1945 |
| 2,409,497 | Kessel | Oct. 15, 1946 |